United States Patent
Lu et al.

(10) Patent No.: US 11,010,699 B1
(45) Date of Patent: May 18, 2021

(54) ELECTRONIC CALENDAR WITH ANIMATED DAY DETAIL VIEW FOR WORK SHIFT SWAPPING

(71) Applicant: ADP, LLC, Roseland, NJ (US)

(72) Inventors: Kevin Lu, New York, NY (US); Shayne Bowman, Alpharetta, GA (US); Bill Dinh, New York, NY (US); Aaron Miller, New York, NY (US); Eric Stolten, Summit, NJ (US); Pramod Lakshmanan, New York, NY (US); Melissa Scano-Person, Union City, NJ (US); Vinitha Kontham, Edison, NJ (US); Erick Soto, Los Angeles, CA (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/776,990

(22) Filed: Jan. 30, 2020

(51) Int. Cl.
*G06Q 10/06* (2012.01)
*G06Q 10/10* (2012.01)
*G06F 3/0484* (2013.01)
*G06T 3/40* (2006.01)

(52) U.S. Cl.
CPC . *G06Q 10/063116* (2013.01); *G06F 3/04842* (2013.01); *G06F 3/04847* (2013.01); *G06Q 10/1097* (2013.01); *G06T 3/40* (2013.01); *G06F 2203/04803* (2013.01)

(58) Field of Classification Search
CPC ........ G06Q 10/063116; G06Q 10/1097; G06F 3/04842; G06F 3/04847; G06F 2204/04847; G06T 3/40
See application file for complete search history.

(56) References Cited

U.S. PATENT DOCUMENTS

| | | | |
|---|---|---|---|
| 6,370,554 B1 | 4/2002 | Sun-Woo | |
| 7,325,198 B2 | 1/2008 | Adcock et al. | |
| 8,788,308 B1 * | 7/2014 | Cox | G06Q 10/06312 705/7.16 |
| 10,733,637 B1 * | 8/2020 | Singh | G06Q 30/0277 |
| 2003/0088479 A1 * | 5/2003 | Wooten | G06Q 10/109 705/26.1 |

(Continued)

OTHER PUBLICATIONS

Bob Cote, "5 Crucial Features Your Employee Scheduling App Needs To Have", published to web on Oct. 2, 2017 at https://www.subitup.com/blog/articles/20/5-Crucial-Features-Your-Employee-Scheduling-App-Needs-to-Have, retrieved Aug. 12, 2020 (Year: 2017).*

(Continued)

*Primary Examiner* — Shourjo Dasgupta
(74) *Attorney, Agent, or Firm* — Yee & Associates, P.C.

(57) ABSTRACT

An electronic calendar and method of controlling an electronic calendar. A calendar image of a calendar for a person is displayed on a display screen on a display device. The calendar image comprises a plurality of day boxes. A summary of information for the person for a day is displayed in a day box corresponding to the day in the plurality of day boxes. A detail view box is displayed overlaid on the calendar image adjacent to the day box in response to a selection of the day box by an operator. Detailed information for the person for the day is displayed in the detail view box. The detailed information may include work shift information and enable swapping work shifts with others.

20 Claims, 14 Drawing Sheets

(56) References Cited

U.S. PATENT DOCUMENTS

| | | | |
|---|---|---|---|
| 2003/0212589 A1* | 11/2003 | Kish | G06Q 30/02 705/7.16 |
| 2008/0319822 A1* | 12/2008 | LaJoie | G06Q 10/06 705/7.16 |
| 2009/0158173 A1 | 6/2009 | Palahnuk et al. | |
| 2013/0090968 A1* | 4/2013 | Borza | G06Q 10/06 705/7.16 |
| 2018/0158548 A1* | 6/2018 | Taheri | G06Q 10/06311 |
| 2018/0330814 A1* | 11/2018 | Auer | G16H 40/20 |

OTHER PUBLICATIONS

Business Management Systems, "Employee Scheduling with Snap Schedule: Shift Swapping and Approval in Snap Schedule", published to web on Oct. 17, 2011 at https://www.bmscentral.com/learn-employee-scheduling/shift-swapping-and-approval-in-snap-schedule/, retrieved Aug. 12, 2020 (Year: 2011).*

When I Work, "Accept Shift Swap and Drop Requests", published to web on Jan. 15, 2020 at https://help.wheniwork.com/articles/accept-shift-swap-and-drop-requests-ios/, retrieved Aug. 12, 2020 (Year: 2020).*

Mitrefinch, "Tips To Effectively Manage ShiftTrades and Avoid Employee Conflicts", published to web on Nov. 18, 2016 at https://mitrefinch.com/blog/tips-to-effectively-manage-shift-trades-and-avoid-employee-conflicts/, retrieved Aug. 12, 2020 (Year: 2016).*

"Dayforce Software Functionality and Global Use Guide", published to web on Feb. 1, 2019 at https://ceridian.com/Ceridian/media/Files/contracts/Dayforce-Software-Functionality-and-Global-Use-Guide_2019-01-EN.pdf, retrieved Aug. 12, 2020 (Year: 2019).*

YouTube, "How to Swap Shifts", uploaded on Nov. 17, 2014 to https://www.youtube.com/watch?v=dRVEtM3Bi7w, retrieved Dec. 1, 2020 (Year: 2014).*

Calendar Detail View in Outlook, http://www.outlook-tips.net/how-to/calendar-detail-view-in-microsoft-outlook, retrieved from the Internet on Mar. 21, 2019, 18 pages.

Furnas, "The Fisheye Calendar System", Bellcore Technical Memorandum, Nov. 19, 1991, 9 pages.

Bederson et al., DateLens: A Fisheye Calendar Interface for PDAs, ACM Transactions on Computer-Human Interaction, vol. 11, No. 1, Mar. 2004, pp. 90-119.

Dynamic Calendar Quick Reference, 2012, Sabre Travel Network, Version 1.0.2, 7 pages.

Dynamic Calendar for Retailers, Oct. 7, 2015, Natural Insight, https://www.naturalinsight.com/nubfs/00_ReleaseNotices/100715_Release_Notice_Dynamic_Calendar/Natural_Insight_Dynamic_Calendar_Feature_Guide_for_Staff_Members_in_Retail.pdf?t=1503064629865, 14 pages.

* cited by examiner

FIG. 9

Your Time 902

Clocked In
8:59 AM
MAR 1

Thursday
MAR 1

916  CLOCK OUT

Current Time: 10:30:11 AM

Things To Do 912

THIS WEEK

- Policy Agreement
  2 pending
- Submit Timecard
  Due Friday

1 MORE TASK

Pay Info 906    ⊙ Show 1 of 3 STATEMENTS

FEB 24, 2018
TAKE HOME  $X,XXX.XX
GROSS  $X,XXX.XX

Hours 90.32

• ○ ○

Paycard

CARD ENDING IN 4506    ⊙ Show

Available Balance
$X,XXX.XX

Lost or Stolen Card? (887) 237-4321

914

Time Off 904

BALANCE (as of MAR 1, 2018)

| Comp Days | 7 days |
| Sick | 24 hours |
| Personal | 78 hours |
| Vacation | 90 hours |
| Holiday | 6 days |

Above doesn't include
10 pending requests

REQUEST TIME OFF

VIEW TIME OFF REQUESTS

Schedule 908

THIS WEEK: Feb 26-Mar 2

| MON 26 | TUES 27 | WED 2 |
| 9am-5pm Working Lunch 1pm-1:45pm | 9am-5pm Working Lunch 1pm-1:45pm | 9am-5 Worki Lunc 1pm-1:4 |

• ○ ○

Benefits

1 of 3 ELECTIONS

Medical  Heartland Value Network HMO

WHO'S COVERED

Matthew  Anna

ELECTRONIC CALENDAR WITH ANIMATED DAY DETAIL VIEW FOR WORK SHIFT SWAPPING

BACKGROUND INFORMATION

1. Field

The present disclosure relates generally to an electronic calendar and, more particularly, to a method and apparatus for displaying information in an electronic calendar. Still more particularly, the present disclosure relates to a method and apparatus for using an electronic calendar to swap work shifts between workers.

2. Background

Calendaring software is software that provides users with an electronic version of a calendar. An electronic calendar may provide various featured and tools and provide multiple views. For example, an electronic calendar may allow users to selectively display one day, one week, one month, or one year of the calendar.

A relatively large amount of information may be stored in an electronic calendar. Only a portion of that information may be displayed in any particular view selected by a user. It is desirable that an electronic calendar allow a user to display desired information from the calendar in an effective and efficient manner.

A human resources management system, HRMS, comprises software implemented in a computer system that combines a number of systems and processes to facilitate the management of human resources, business processes and data. A human resources management system also may be referred to as a human resources information system, HRIS, or human capital management, HCM.

A human resources management system may provide employee self-service, ESS, functions. Employee self-service functions provide employees access to their personal records and details and may allow employees to control certain aspects of their employment. It is desirable that employee self-service functions include features that allow employees to take more responsibility for their jobs and development.

Accordingly, it would be beneficial to have a method and apparatus that take into account one or more of the issues discussed above as well as possibly other issues.

SUMMARY

An embodiment of the present disclosure provides an electronic calendar comprising a calendar view generator, a detail view generator, and a shift swap engine. The calendar view generator is configured to display a calendar image of a calendar for a first person on a display screen on a display device. The calendar image comprises a plurality of day boxes. A summary of information for the first person for a day is displayed in a day box corresponding to the day in the plurality of day boxes. The detail view generator is configured to display a detail view box overlaid on the calendar image in response to a selection of the day box by an operator. Shift information regarding a first work shift for the first person on the day and a shift swap request control element for requesting a shift swap are displayed in the detail view box. The shift swap engine is configured to, in response to a selection of the shift swap request control element by the operator, identify a second work shift for a second person and send a shift swap request to exchange the second work shift for the first work shift to the second person.

Another embodiment of the present disclosure provides a method of controlling an electronic calendar. A calendar image of a calendar for a first person is displayed on a display screen on a display device. The calendar image comprises a plurality of day boxes. A summary of information for the first person for a day is displayed in a day box corresponding to the day in the plurality of day boxes. A detail view box is displayed overlaid on the calendar image in response to a selection of the day box by an operator. Shift information regarding a first work shift for the first person on the day and a shift swap request control element for requesting a shift swap are displayed in the detail view box. In response to a selection of the shift swap request control element by the operator, a second work shift for a second person is identified and a shift swap request to exchange the second work shift for the first work shift is sent to the second person.

Yet another embodiment of the present disclosure provides an electronic calendar comprising a calendar view generator and a detail view generator. The calendar view generator is configured to display a calendar image of a calendar for a person on a display screen on a display device. The calendar image comprises a plurality of day boxes. A first summary of information for the person for a first day is displayed in a first day box corresponding to the first day in the plurality of day boxes. A second summary of information for the person for a second day is displayed in a second day box corresponding to the second day in the plurality of day boxes. The detail view generator is configured to display a first detail view box adjacent to the first day box in response to a selection of the first day box by an operator. First detailed information for the person for the first day is displayed in the first detail view box. The first detailed information comprises more information than the first summary of information. The detail view generator also is configured to stop displaying the first detail view box and display a second detail view box adjacent to the second day box in response to a selection of the second day box by the operator while the first detail view box is being displayed. Second detailed information for the person for the second day is displayed in the second detail view box. The second detailed information comprises more information than the second summary of information.

Still another embodiment of the present disclosure provides a method of controlling an electronic calendar. A calendar image of a calendar for a person is displayed on a display screen on a display device. The calendar image comprises a plurality of day boxes. A first summary of information for the person for a first day is displayed in a first day box corresponding to the first day in the plurality of day boxes. A second summary of information for the person for a second day is displayed in a second day box corresponding to the second day in the plurality of day boxes. A first detail view box is displayed adjacent to the first day box in response to a selection of the first day box by an operator. First detailed information for the person for the first day is displayed in the first detail view box. The first detailed information comprises more information than the first summary of information. Displaying of the first detail view box is stopped and a second detail view box is displayed adjacent to the second day box in response to a selection of the second day box by the operator while the first detail view box is being displayed. Second detailed information for the person for the second day is displayed in the second detail view box.

The second detailed information comprises more information than the second summary of information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 is an illustration of an employee dashboard in accordance with an illustrative embodiment;

FIG. 10 is an illustration of a detail view box for requesting a shift swap overlaid on a calendar image in accordance with an illustrative embodiment;

FIG. 11 is an illustration of a shift search interface in accordance with an illustrative embodiment;

FIG. 12 is an illustration of a detail view box for accepting a requested shift swap overlaid on a calendar image in accordance with an illustrative embodiment;

DETAILED DESCRIPTION

The illustrative embodiments recognize and take into account one or more different considerations. For example, the illustrative embodiments recognize and take into account that it is desirable that the information in an electronic calendar is displayed in an effective and efficient manner. Information in an electronic calendar is displayed effectively when the information is displayed clearly and for as long as the information is needed. Information in an electronic calendar is displayed efficiently when the amount of user input required to display the information is relatively low.

The illustrative embodiments also recognize and take into account that it is desirable that employee self-service functions include features that allow employees to take more control of their jobs. For example, it is desirable that employees that work shifts be able to swap shifts with other employees.

The illustrative embodiments provide an electronic calendar that includes a flexible detail view box that displays detailed information for a selected day and that follows a selected cell of a displayed calendar image. The detail view box is displayed in a manner that makes it more efficient for a user to navigate their calendar and get insights about their schedule.

In accordance with an illustrative embodiment, when a user selects a day in a displayed calendar image, the detail view box is displayed adjacent to the selected day box wherever there is space on the screen. The detail view box contains detailed information for the selected day. When the user selects another day, the detail view box will animate to a position adjacent to the newly selected day box and be a continuous reference for additional information.

The detail view box may include details of an employee work shift for the selected day. The detail view box may also allow the employee to perform an action. For example, without limitation, the detail view box may allow the employee to request or accept a shift swap with another employee.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

Figure 1:
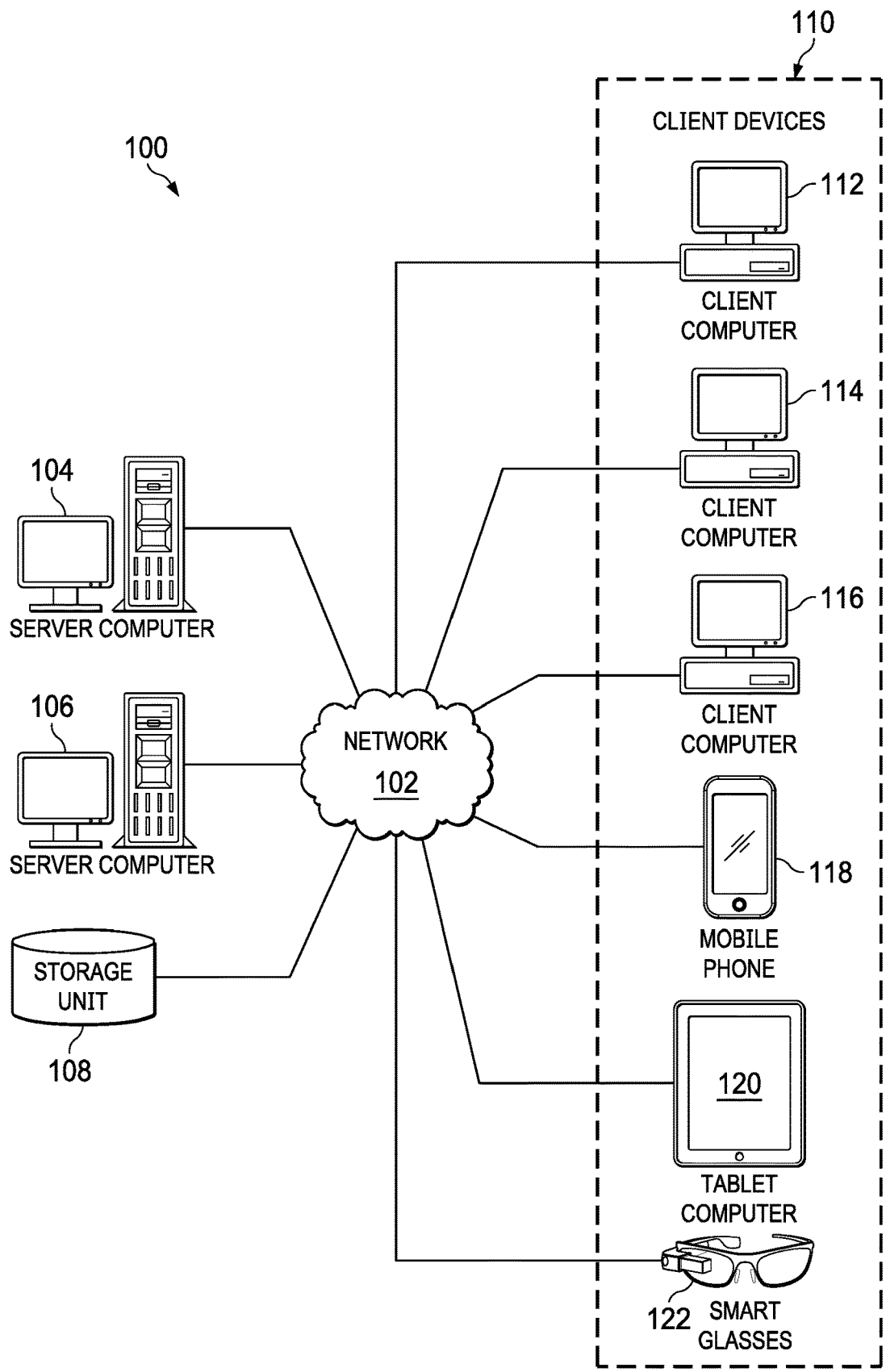
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

Network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Figure 2:
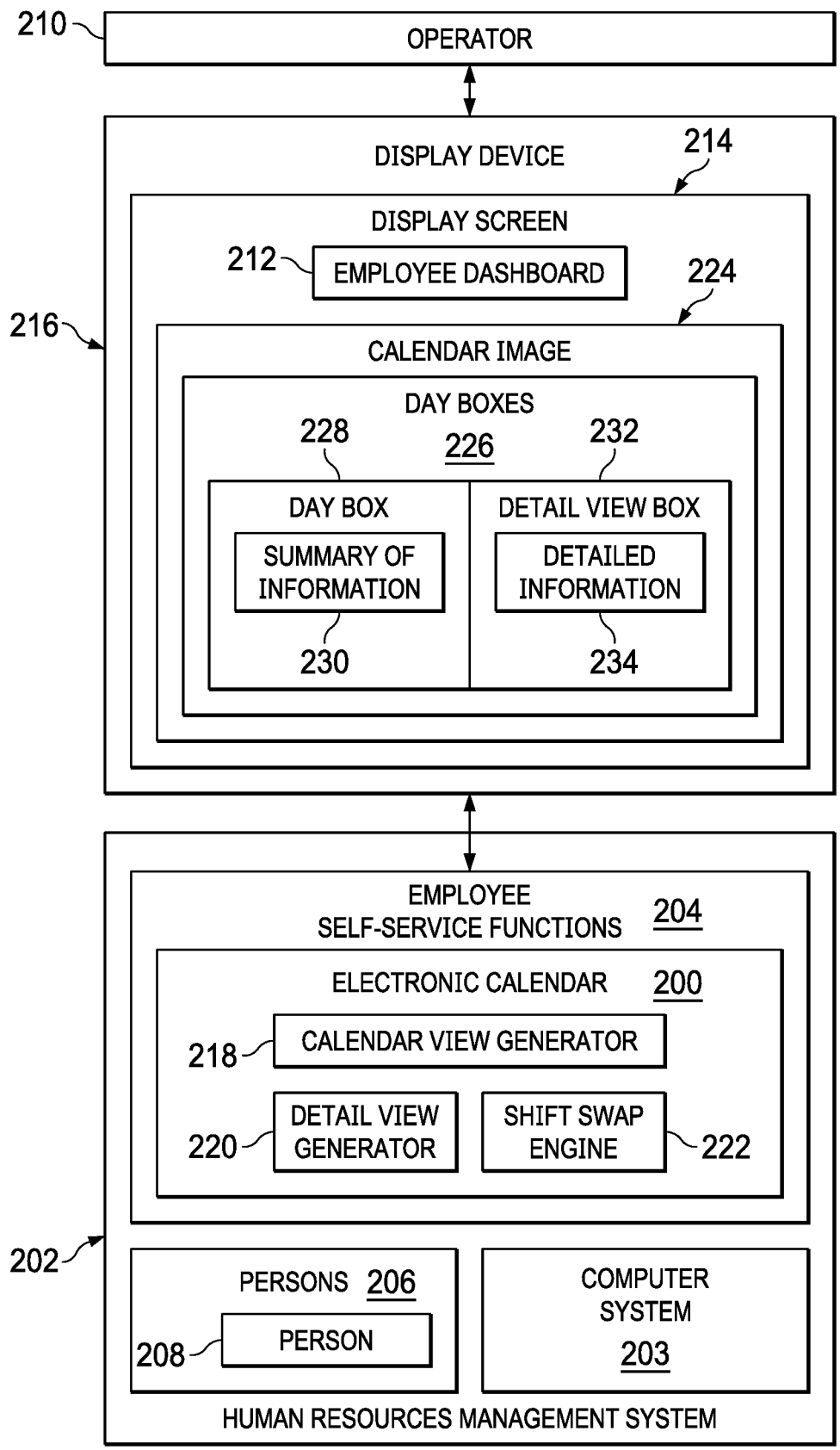
FIG. 2 is an illustration of a block diagram of an electronic calendar in accordance with an illustrative embodiment.

Turning to FIG. 2, an illustration of a block diagram of an electronic calendar is depicted in accordance with an illustrative embodiment. Electronic calendar 200 may be implemented in a computer system, such as network data processing system 100 in FIG. 1. For example, without limitation, electronic calendar 200 may be implemented as part of human resources management system 202 for a business or other appropriate entity.

In this illustrative example, human resources management system 202 is implemented using computer system 203. Computer system 203 is a physical hardware system and includes one or more data processing systems. When more than one data processing system is present in computer system 203, those data processing systems are in communication with each other using a communications medium. The communications medium can be a network. The data processing systems can be selected from at least one of a computer, a server computer, a tablet computer, or some other suitable data processing system.

Electronic calendar 200 may be implemented as part of employee self-service functions 204 of human resources management system 202. Employee self-service functions 204 may include various functions provided for persons 206. Employee self-service functions 204 for person 208 in persons 206 may be accessed by operator 210 via employee dashboard 212. For example, without limitation, electronic calendar 200 for person 208 may be accessed by operator 210 via employee dashboard 212 for person 208. Operator 210 may be person 208 or someone authorized to use employee self-service functions 204, including electronic calendar 200, for person 208.

Employee dashboard 212 may be displayed by employee self-service function 204 on display screen 214 on display device 216. Display device 216 may be any appropriate device that may be configured to allow operator 210 to interact with employee dashboard 212. For example, without limitation, display device 216 may be implemented as one of client devices 110 in network data processing system 100 in FIG. 1.

Electronic calendar comprises calendar view generator 218, detail view generator 220, and shift swap engine 222. Calendar view generator 218 is configured to generate and display calendar image 224 of a calendar for person 208 on display screen 214 on display device 216. Calendar image 224 comprises day boxes 226 corresponding to the days displayed in calendar image 224. Day box 228 in day boxes 228 may include a display of summary of information 230 for the day represented by day box 228.

Detail view generator 220 is configured to generate and display detail view box 232 overlaid on calendar image 224 in response to a selection of day box 228 by operator 210. Detail view generator 220 is configured to display detail view box 232 in a position adjacent to day box 228 selected by operator 210. Detail view generator 220 may use the processes described below with reference to FIGS. 3-8 and 13 to determine the position on calendar image 224 at which detail view box 232 will be displayed.

Detailed information 234 for the day corresponding to selected day box 228 is displayed in detail view box. Detailed information 232 comprises more information for the day then summary of information 230 for the day displayed in day box 228.

Shift swap engine 222 is configured to use electronic calendar 200 to implement an exchange of scheduled work shifts between persons 206. Processes implemented by shift swap engine 222 to implement such shift swaps are described in detail below with reference to FIGS. 10-12, 14, and 15.

The illustration of the different components in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
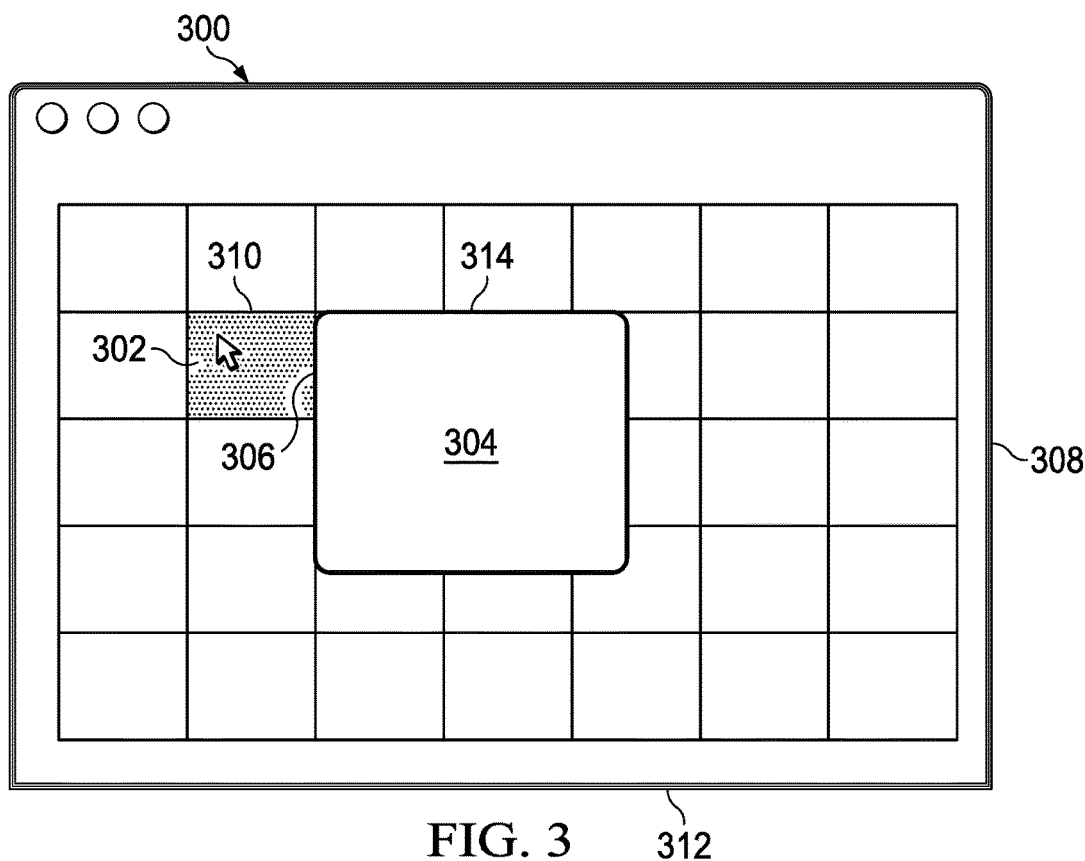
FIGS. 3-8 are illustrations of examples of displays of a detail view box overlaid on a calendar image in accordance with an illustrative embodiment.

Turning to FIG. 3, an illustration of an example display of a detail view box overlaid on a calendar image is depicted in accordance with an illustrative embodiment. Calendar image 300 is an example of one implementation of calendar image 224 in FIG. 2 without any information displayed thereon.

In this example, day box 302 in calendar image 300 is selected by an operator. It is determined that the width of detail view box 304 fits between right side 306 of day box 302 and right side 308 of calendar image 300. Therefore, detail view box 304 is displayed adjacent to right side 306 of day box 302.

It is also determined that the length of detail view box 304 fits between top side 310 of day box 302 and bottom side 312 of calendar image 300. Therefore, detail view box 304 is displayed with top side 314 of detail view box 304 aligned with top side 310 of day box 302.

Figure 4:
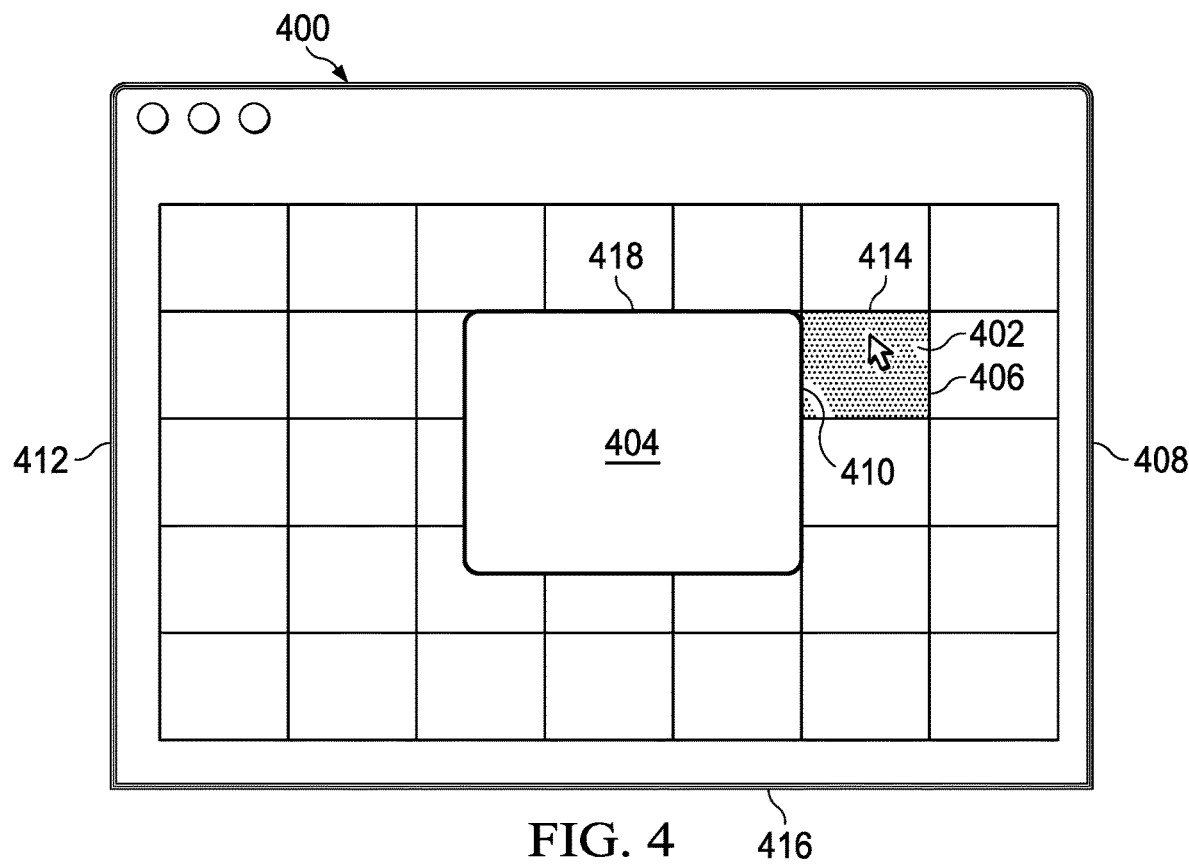

Turning to FIG. 4, an illustration of another example display of a detail view box overlaid on a calendar image is depicted in accordance with an illustrative embodiment. Calendar image 400 is another example of one implementation of calendar image 224 in FIG. 2 without any information displayed thereon.

In this example, day box 402 in calendar image 400 is selected by an operator. It is determined that the width of detail view box 404 does not fit between right side 406 of day box 402 and right side 408 of calendar image 400. However, it is determined that the width of detail view box 404 does fit between left side 410 of day box 402 and left side 412 of calendar image 400. Therefore, detail view box 404 is displayed adjacent to left side 410 of day box 402.

It is also determined that the length of detail view box 404 fits between top side 414 of day box 402 and bottom side 416 of calendar image 400. Therefore, detail view box 404 is displayed with top side 418 of detail view box 404 aligned with top side 414 of day box 402.

Figure 5:
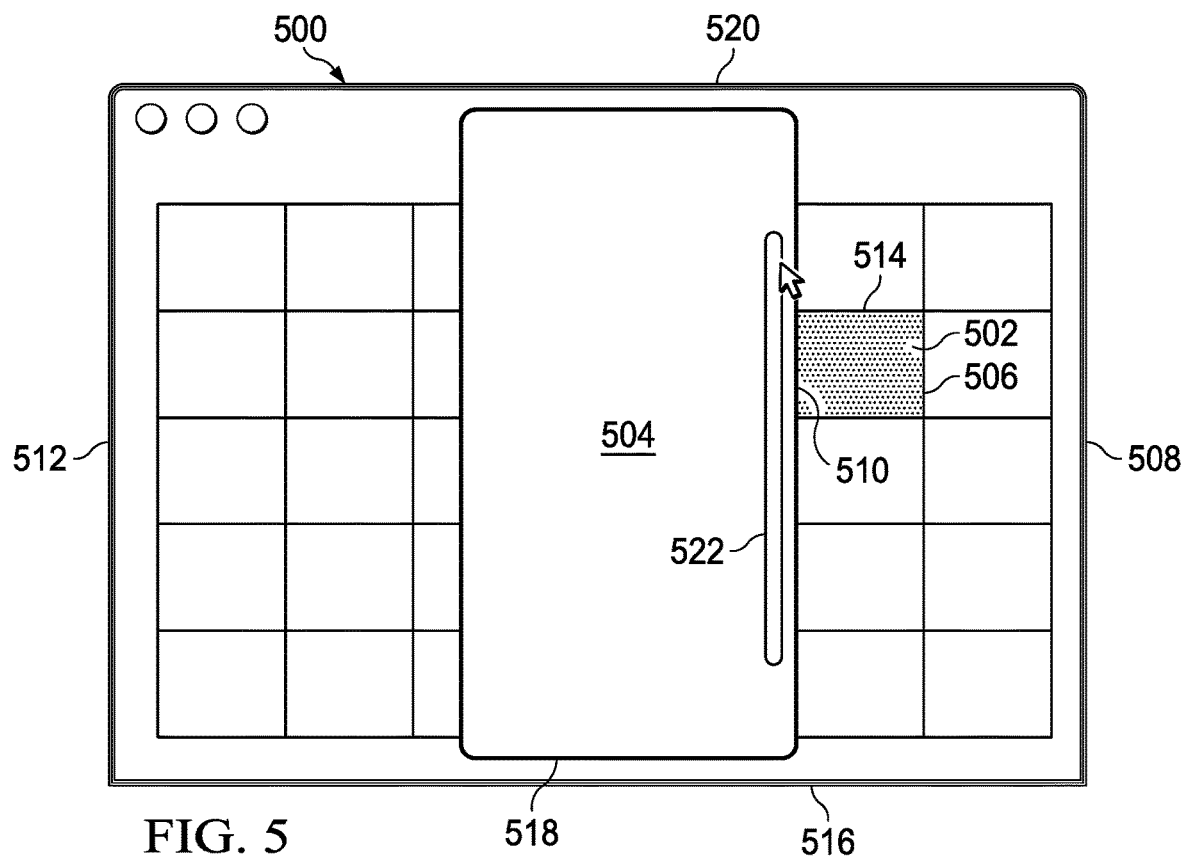

Turning to FIG. 5, an illustration of another example display of a detail view box overlaid on a calendar image is depicted in accordance with an illustrative embodiment. Calendar image 500 is another example of one implementation of calendar image 224 in FIG. 2 without any information displayed thereon.

In this example, day box 502 in calendar image 500 is selected by an operator. It is determined that the width of detail view box 504 does not fit between right side 506 of day box 502 and right side 508 of calendar image 500. However, it is determined that the width of detail view box 504 does fit between left side 510 of day box 502 and left side 512 of calendar image 500. Therefore, detail view box 504 is displayed adjacent to left side 510 of day box 502.

It is also determined that the length of detail view box 504 does not fit between top side 514 of day box 502 and bottom side 516 of calendar image 500. Therefore, detail view box 504 is displayed with bottom side 518 of detail view box 504 adjacent to bottom side 516 of calendar image 500.

The maximum length of detail view box 504 may be approximately the distance between top side 520 of calendar image 500 and bottom side 516 of calendar image 500. In this example, the maximum length of detail view box 504 is not sufficient to display all of the information to be displayed in detail view box 504 at the same time. In this case, a portion of the information to be displayed in detail view box 504 that is less than all of the information to be displayed in detail view box 504 may be displayed at one time. Slider interface 522 may be provided for detail view box 504 to allow an operator to change the portion of the information that is displayed in detail view box 504.

Figure 6:
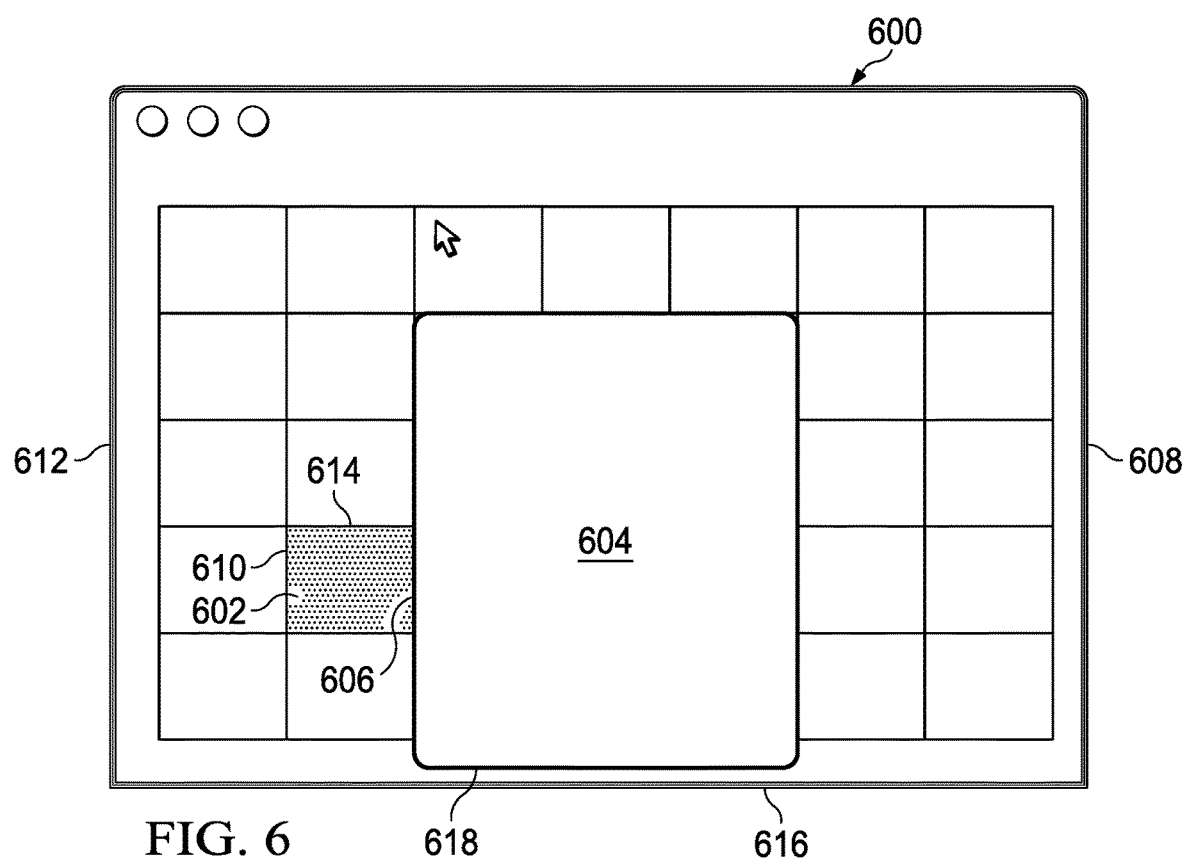
Figure 7:
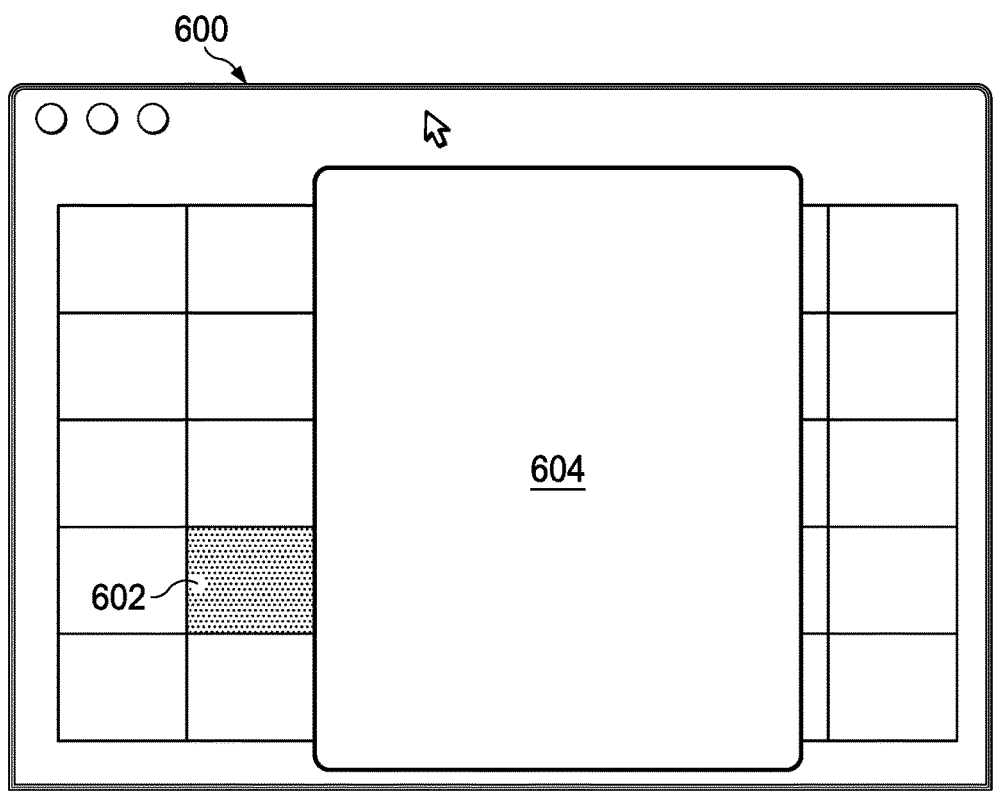
Figure 8:
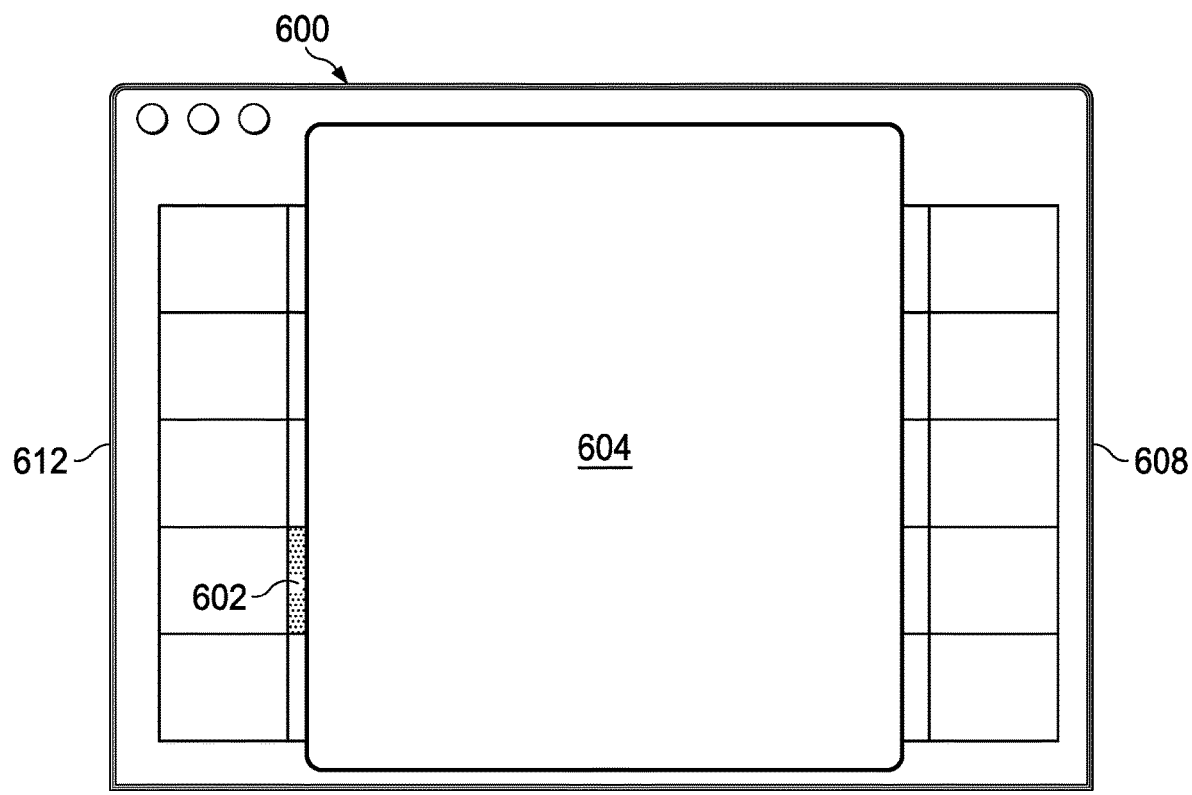

Turning to FIGS. 6-8, an illustration of further example displays of a detail view box overlaid on a calendar image is depicted in accordance with an illustrative embodiment. Calendar image 600 is another example of one implementation of calendar image 224 in FIG. 2 without any information displayed thereon. In this example, the size of calendar image 600 is reduced from FIG. 6 to FIG. 7 and further reduced from FIG. 7 to FIG. 8. For example, without limitation, the size of calendar image 600 may be reduced or increased by an operation performed by an operator.

In FIG. 6, day box 602 is selected by an operator. It is determined that the width of detail view box 604 fits between right side 606 of day box 602 and right side 608 of calendar image 600. Therefore, detail view box 604 is displayed adjacent to right side 606 of day box 602. It is noted that the width of detail view box 604 does not fit between left side 610 of day box 602 and left side 612 of calendar image 600.

It is also determined that the length of detail view box 604 does not fit between top side 614 of day box 602 and bottom side 616 of calendar image 600. Therefore, detail view box 604 is displayed with bottom side 618 of detail view box 604 adjacent to bottom side 616 of calendar image 600.

In FIG. 7, the size of calendar image 600 has been reduced from the size of calendar image 600 in FIG. 6. However, the sized of detail view box 604 has not been reduced. Therefore, the quality of the display of detailed information in detail view box 604 overlaid on calendar image 600 may be maintained when the size of calendar image 600 is reduced.

In FIG. 8, the size of calendar image 600 has been further reduced from the size of calendar image 600 in FIG. 7. However, the sized of detail view box 604 has not been reduced, to maintain the quality of the display of detailed information in detail view box 604 overlaid on calendar image 600.

In FIG. 8, the size of calendar image 600 has been reduced by an amount such that the width of detail view box 604 does not fit between day box 602 and either right side 608 or left side 612 of calendar image 600. Therefore, to maintain the size of detail view box 604, detail view box 604 is displayed over day box 602 in calendar image 600.

If the size of calendar image 600 is reduced further, and the size of detail view box 604 is not reduced, it may be determined that the portion of calendar image 600 overlaid by detail view box 604 exceeds a threshold percentage of the size of calendar image 600. In this case, a full screen display of detail view box 604 may be displayed, in which the display of detail view box 604 fills substantially the entire area in which calendar image 600 was displayed.

Turning to FIG. 9, an illustration of an employee dashboard is depicted in accordance with an illustrative embodiment. Employee dashboard 900 is an example of one implementation of employee dashboard 212 in FIG. 2.

Employee dashboard 900 may be configured to allow an operator to perform various employee self-service functions and other appropriate functions. For example, without limitation, employee dashboard 900 may include window 902 for clocking in and out of work, window 904 for monitoring and requesting time off from work, window 906 for displaying pay information, window 908 for displaying schedule information, window 910 for displaying benefits information, window 912 for displaying tasks to be performed, and window 914 for displaying a pay card balance.

Employee dashboard 900 also may include control element 916 for accessing an electronic calendar. For example, without limitation, control element 916 may comprise a virtual button or other appropriate control element.

Figure 10:
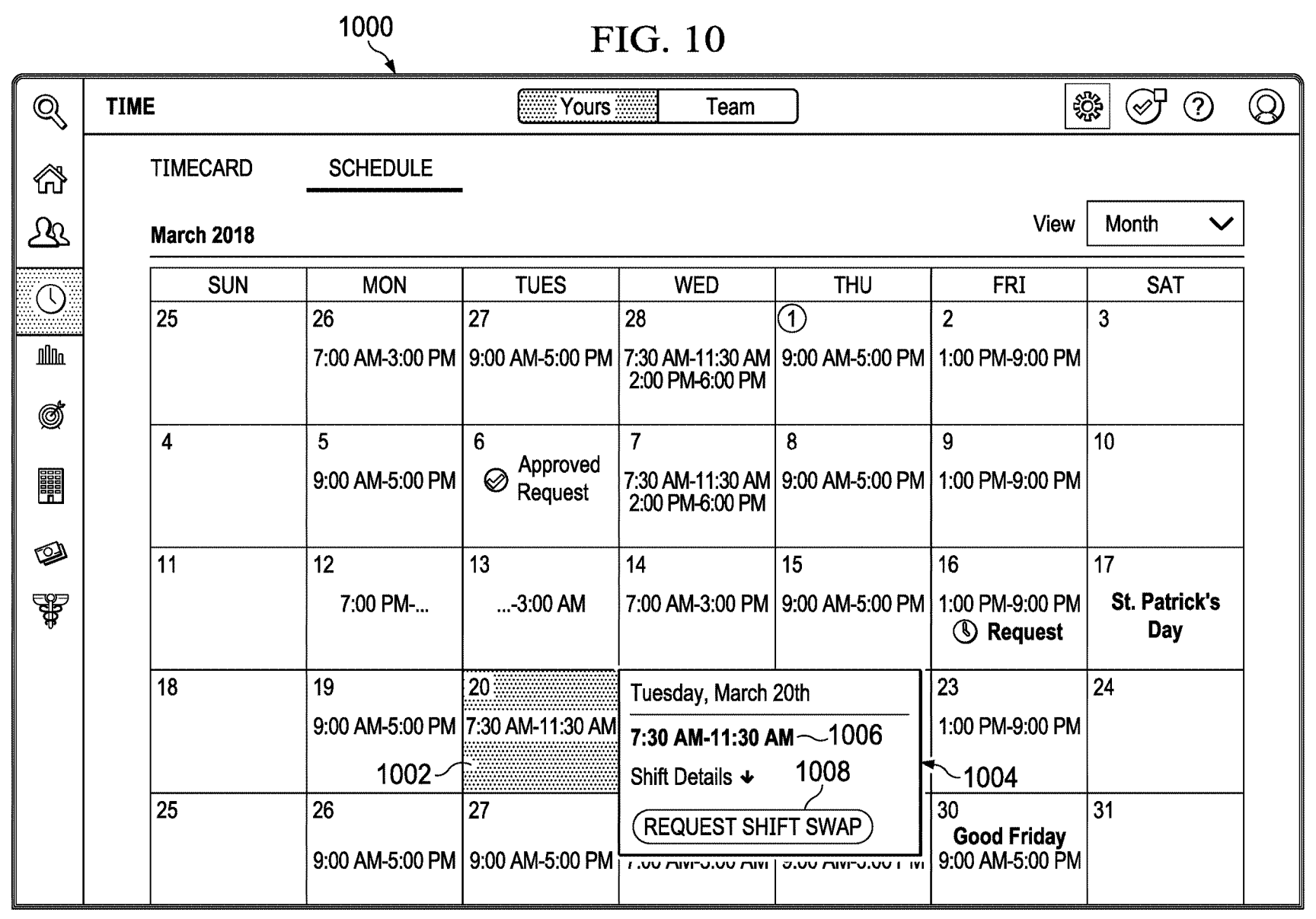

Turning to FIG. 10, an illustration of a detail view box for requesting a shift swap overlaid on a calendar image is depicted in accordance with an illustrative embodiment. Calendar image 1000 is an example of one implementation of calendar image 224 in FIG. 1. Calendar image 1000 may be displayed in response to selecting control element 916 in employee dashboard 900 in FIG. 9.

In this example, day box 1002 in calendar image 1000 has been selected by an operator. In response to the selection of day box 1002, detail view box 1004 for the day corresponding to day box 1002 is displayed adjacent to day box 1002. In this example, shift information 1006 for a work shift scheduled for the day and shift swap request control element 1008 for requesting a shift swap are displayed in detail view box 1004. For example, without limitation, shift swap request control element 1008 may comprise a virtual button or other appropriate control element.

Figure 11:
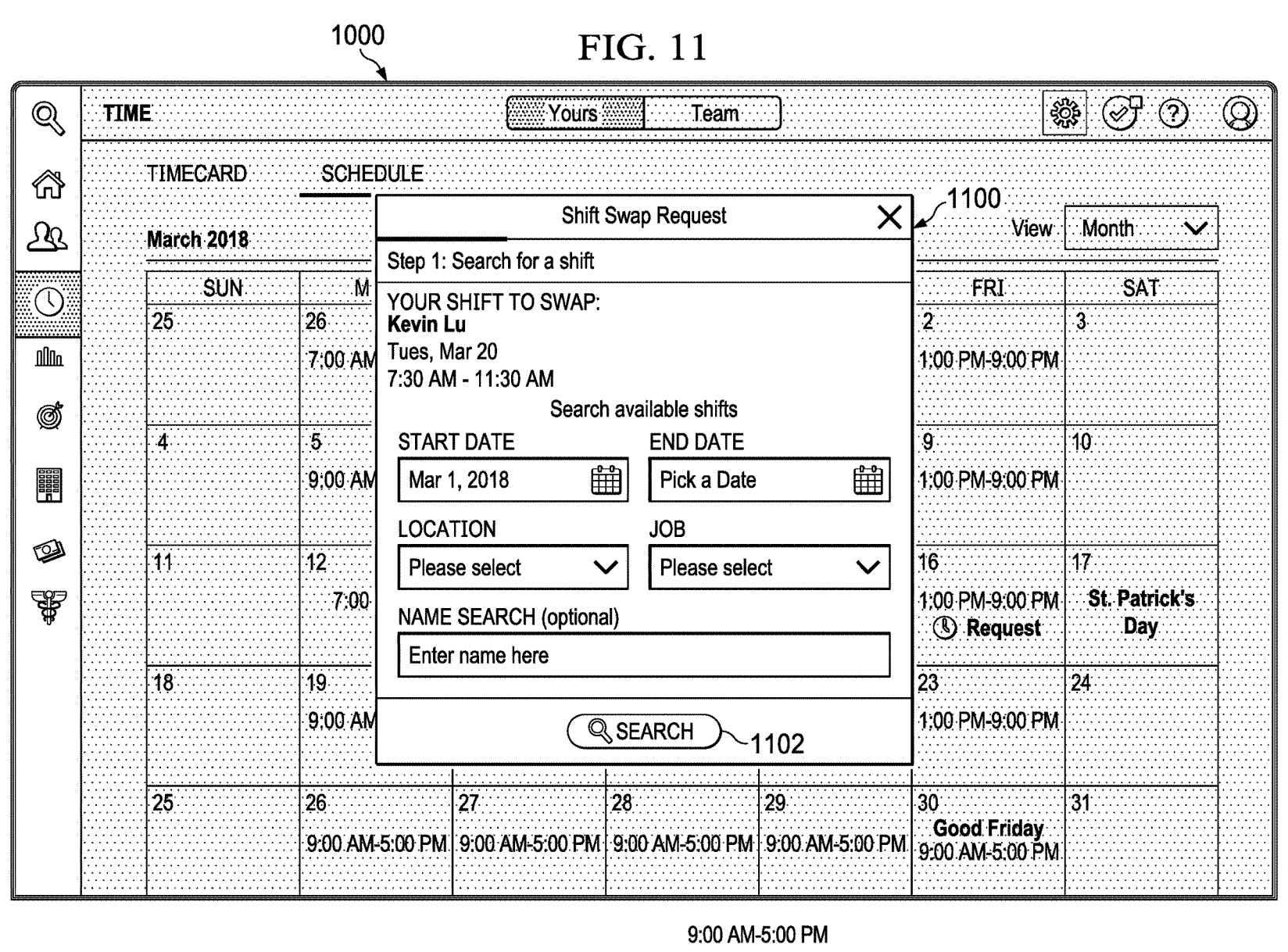

Turning to FIG. 11, an illustration of a shift search interface is depicted in accordance with an illustrative embodiment. Shift search interface 1100 may displayed in response to the selection of shift swap request control element 1008 in detail view box 1004 in FIG. 10. For example, without limitation, shift search interface 1100 may be displayed overlaid on calendar image 1000 in FIG. 10.

Shift search interface 1100 is configured to allow an operator to specify parameters for identifying available work shifts of other persons that would be acceptable for swapping. For example, without limitation, shift search interface may 1100 prompt an operator to enter one or more of dates for acceptable shifts, locations of acceptable shifts, job type of acceptable shifts, name of other person with acceptable shifts, or any other appropriate parameters.

After entering appropriate parameters in shift search interface 1100, a search for available shifts that satisfy the parameters may be initiated by selecting search button 1102. For example, without limitation, available shifts that satisfy the identified parameters may be identified by the search and listed in an appropriate manner. An operator may then identify a shift for swapping from the listed shifts. A shift swap request then may be sent to the person that is currently assigned to perform the identified shift.

Figure 12:
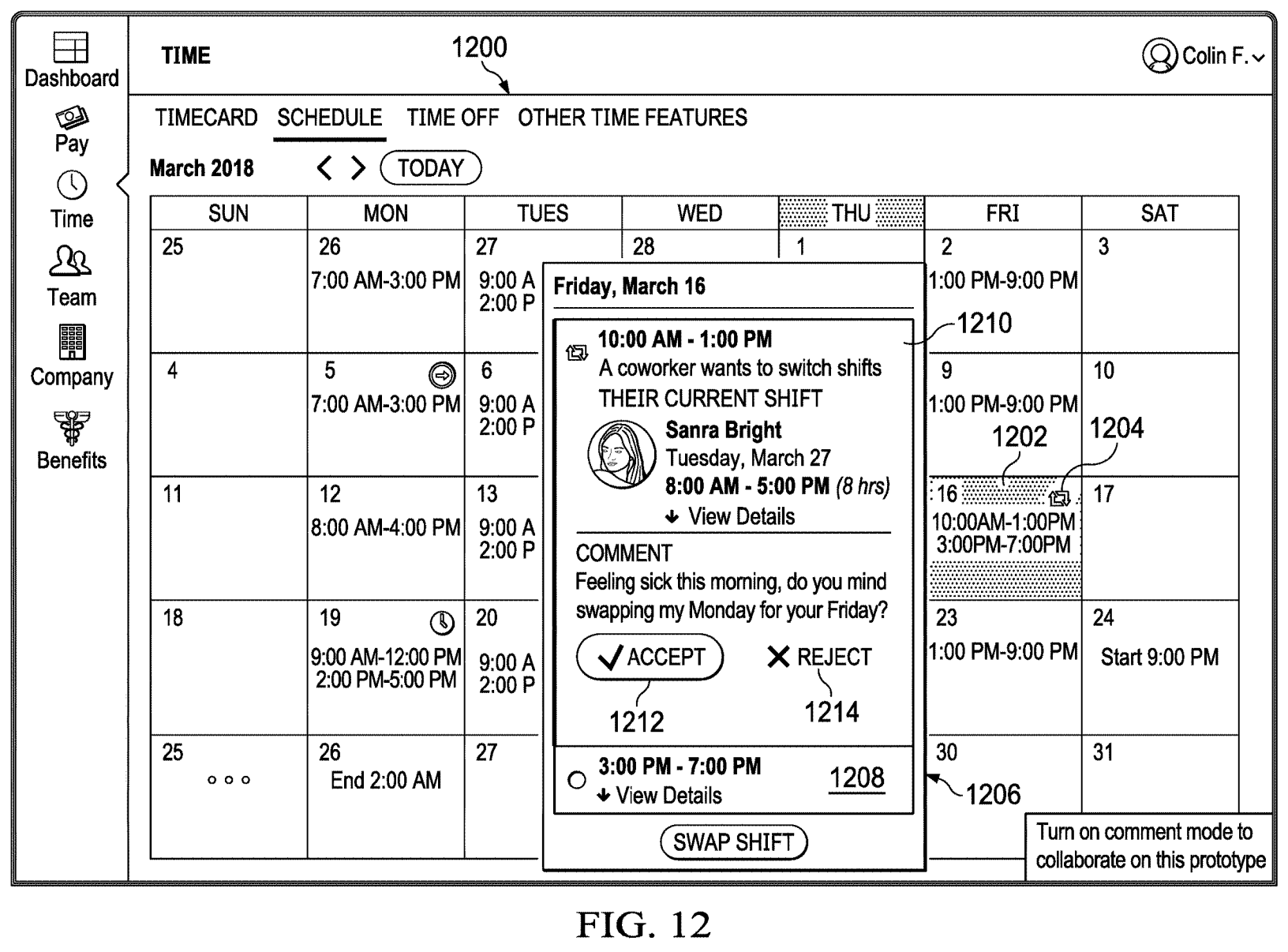

Turning to FIG. 12, an illustration of a detail view box for accepting a requested shift swap overlaid on a calendar image is depicted in accordance with an illustrative embodiment. Calendar image 1200 is an example of one implementation of calendar image 224 in FIG. 1.

In this example, day box 1202 in calendar image 1200 has been selected by an operator. Shift swap requested identifier 1204 may be displayed in day box 1202 to indicate that a swap has been requested for a work shift on the day corresponding to day box 1202. Shift swap requested identifier 1204 may include any appropriate symbol or other identifier.

In response to the selection of day box 1202, detail view box 1206 for the day corresponding to day box 1202 is displayed adjacent to day box 1202. In this example, shift information 1208 for a work shift scheduled for the day, shift information 1210 for a requested shift swap, and shift swap request accept control element 1212 for accepting the shift swap are displayed in detail view box 1206. For example, without limitation, shift swap request accept control element 1212 may comprise a virtual button or other appropriate control element. In response to the selection of shift swap request accept control element 1212, the information in the electronic calendar may be updated to reflect the changes in scheduled work shifts. Detail view box 1206 also may include shift swap request reject control element 1214, to allow an operator to positively reject the requested shift swap.

Figure 13A:
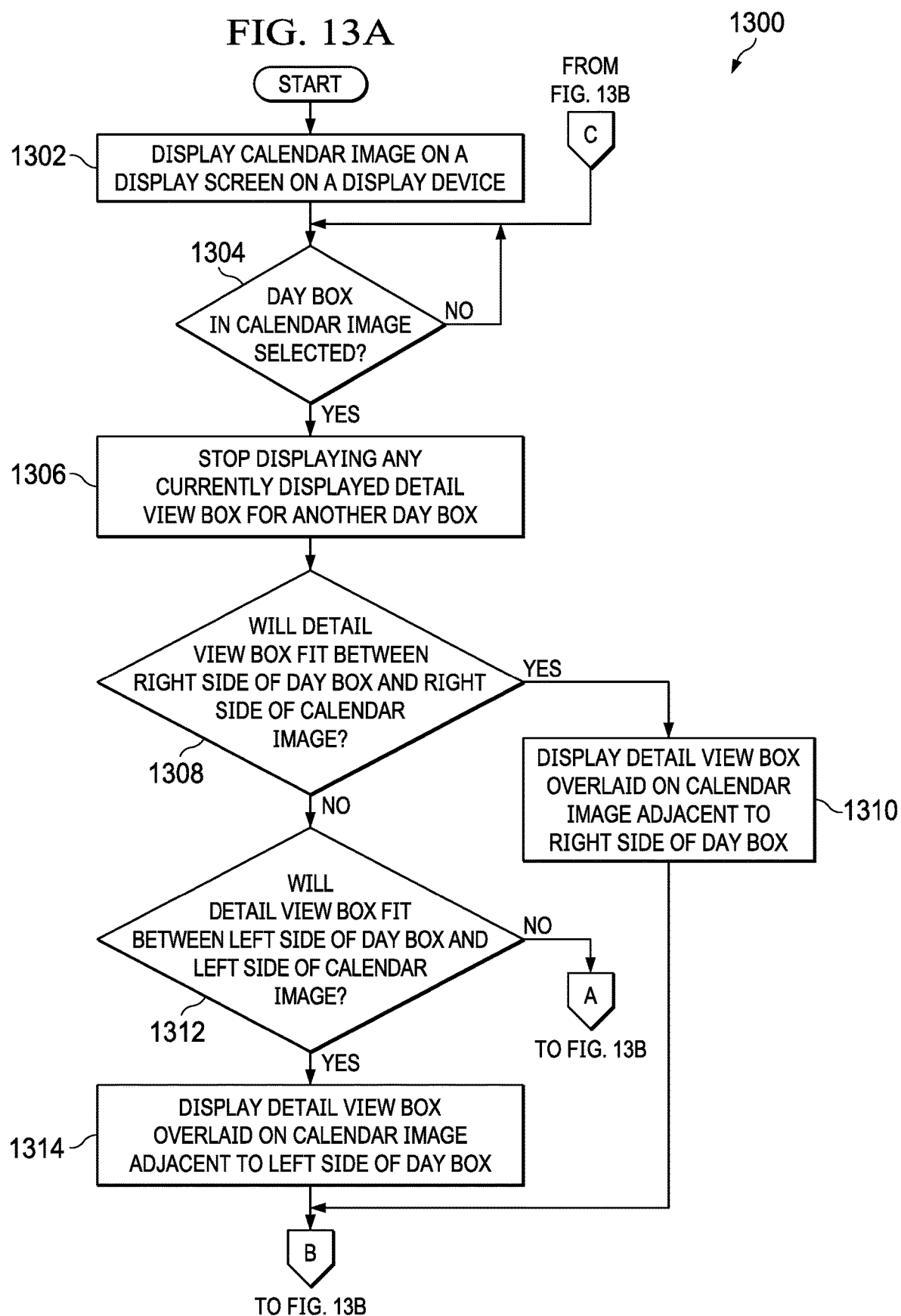
FIGS. 13A and 13B are illustrations of a flowchart of a process for displaying a detail view box overlaid on a calendar image in accordance with an illustrative embodiment.
Figure 13B:
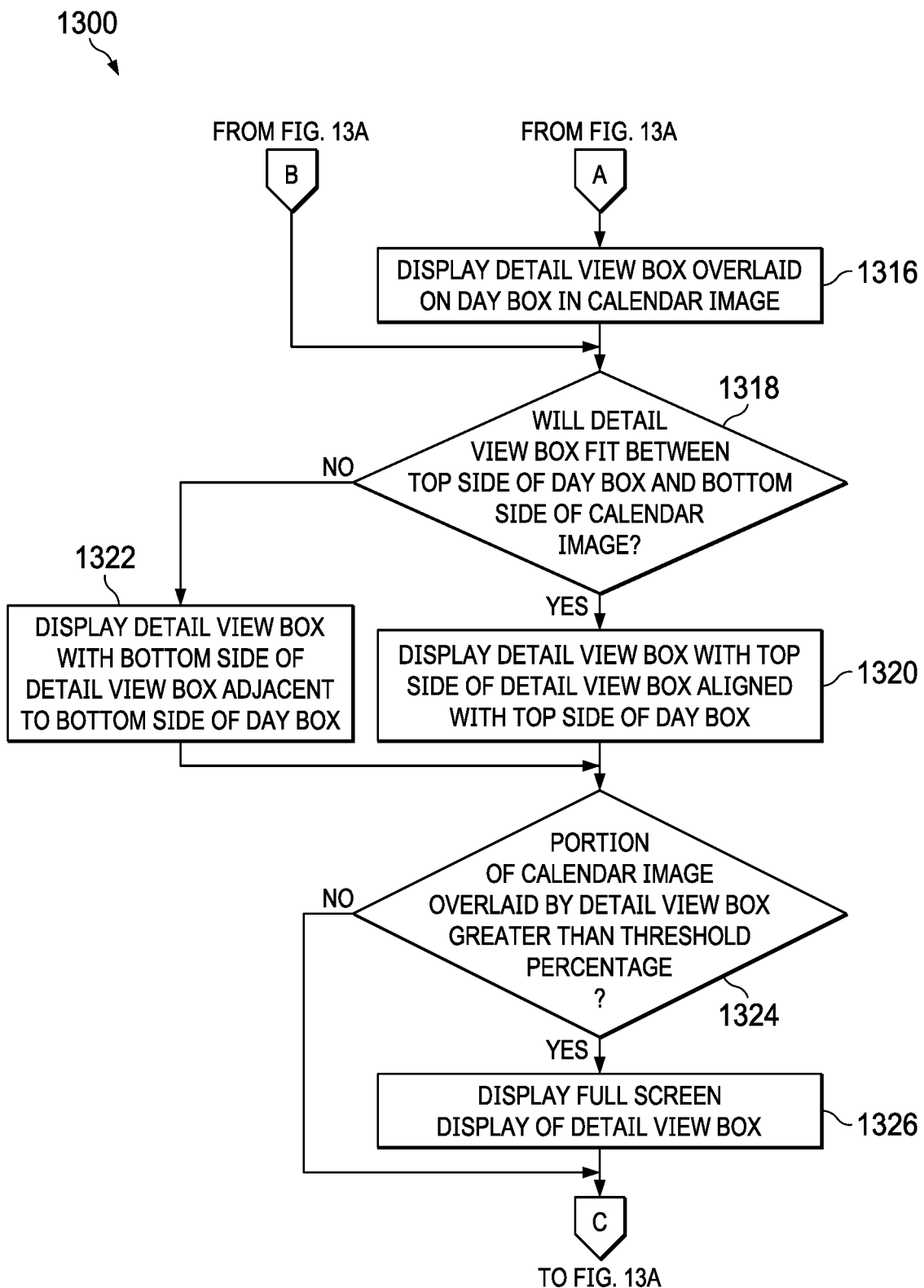

Turning to FIG. 13A and FIG. 13B, illustrations of a flowchart of a process for displaying a detail view box overlaid on a calendar image is depicted in accordance with an illustrative embodiment. Process 1300 may be implemented, for example, by calendar view generator 218 and detail view generator 220 in electronic calendar 200 in FIG. 2.

Process 1300 may begin with displaying a calendar image of a calendar for a person on a display screen on a display device (operation 1302). The calendar image comprises a plurality of day boxes in which a summary of information for the corresponding days may be displayed. It then is determined whether a day box in the calendar image is selected by an operator (operation 1304). Operation 1304 may be repeated until a day box in the calendar image is selected. In response to a determination at operation 1304 that a day box has been selected, the displaying of any currently displayed detail view box for another day box in the calendar image may be automatically stopped (operation 1306).

It then may be determined whether a width of a detail view box to be displayed for the selected day box will fit between the right side of the selected day box and the right side of the calendar image (operation 1308). In response to a determination at operation 1308 that the detail view box will fit between the right side of the selected day box and the right side of the calendar image, the detail view box is displayed overlaid on the calendar image adjacent to the right side of the selected day box (operation 1310). Detailed information for the day corresponding to the selected day box may be displayed in the detail view box.

In response to a determination at operation 1308 that the detail view box will not fit between the right side of the selected day box and the right side of the calendar image, it may be determined whether the width of the detail view box to be displayed will fit between the left side of the selected day box and the left side of the calendar image (operation 1312). In response to a determination at operation 1312 that the detail view box will fit between the left side of the selected day box and the left side of the calendar image, the detail view box is displayed overlaid on the calendar image adjacent to the left side of the selected day box (operation 1314). In response to a determination at operation 1312 that the detail view box will not fit between the left side of the selected day box and the left side of the calendar image, the detail view box is displayed overlaid on the selected day box on the calendar image (operation 1316).

It then may be determined whether a length of the detail view box between the top side of the detail view box and the bottom side of the detail view box fits between the top side of the selected day box and the bottom side of the calendar image (operation 1318). In response to a determination at operation 1318 that a length of the detail view box fits between the top side of the selected day box and the bottom side of the calendar image, the detail view box is displayed with the top side of the detail view box aligned with the top side of the day box (operation 1320). In response to a determination at operation 1318 that a length of the detail view box will not fit between the top side of the selected day box and the bottom side of the calendar image, the detail view box is displayed with the bottom side of the detail view box adjacent to the bottom side of the calendar image (operation 1322).

It then may be determined whether a portion of the calendar image overlaid by the detail view box is greater than a threshold percentage of the size of the calendar image (operation 1324). In response to a determination at operation 1324 that the portion of the calendar image overlaid by the detail view box is greater than the threshold percentage of the size of the calendar image, a full screen display of the detail view box is displayed (operation 1326), with the process returning to operation 1304. Otherwise, the process returns to operation 1304.

Figure 14:
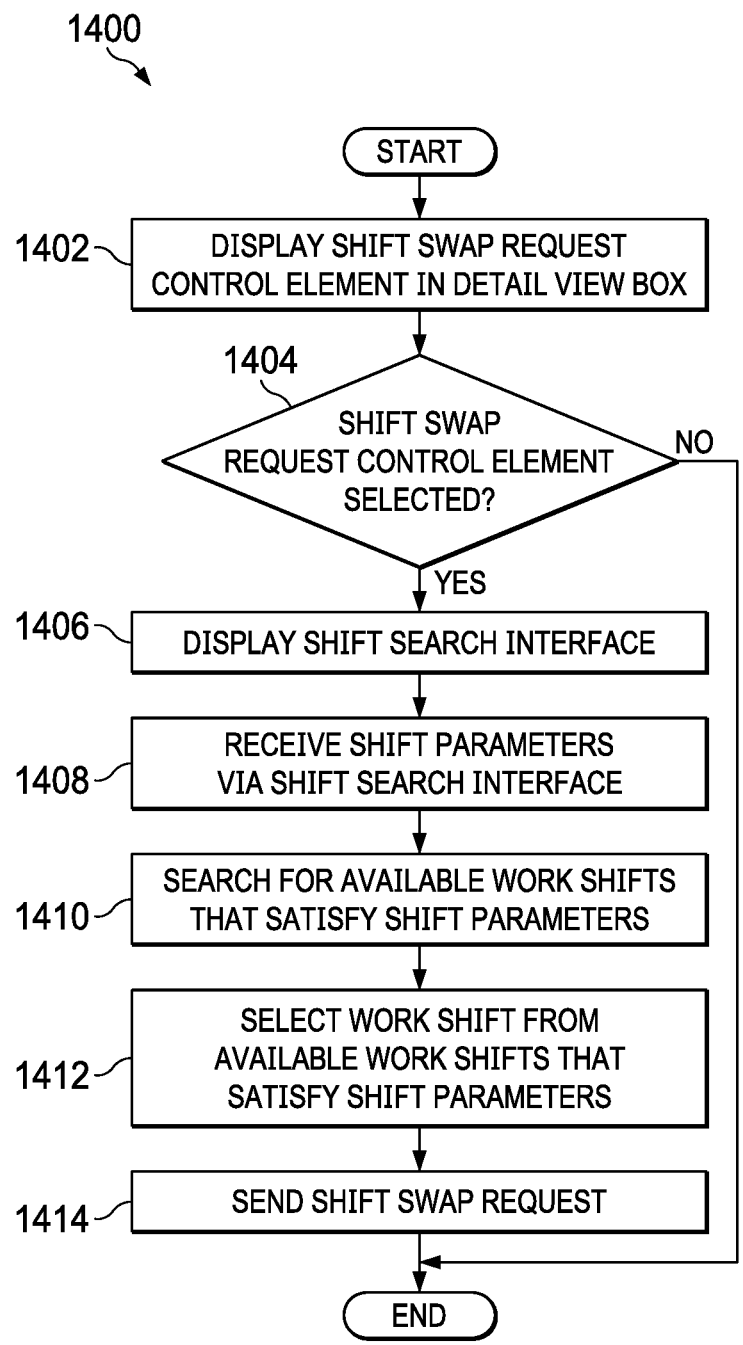
FIG. 14 is an illustration of a flowchart of a process for requesting a shift swap in accordance with an illustrative embodiment.

Turning to FIG. 14, an illustration of a flowchart of a process for requesting a shift swap is depicted in accordance with an illustrative embodiment. Process 1400 may be implemented, for example, by detail view generator 220 and shift swap engine 222 in electronic calendar 200 in FIG. 2.

Process 1400 may begin by displaying a shift swap request control element in a detail view box overlaid on a calendar image (operation 1402). It then may be determined whether the shift swap request control element is selected by an operator (operation 1404). The process may terminate if the shift swap request control element is not selected.

In response to a determination at operation 1402 that the shift swap request control element is selected, a shift search interface may be displayed (operation 1406). Shift parameters for a work shift may be received from an operator via the shift search interface (operation 1408). A search for available work shifts that satisfy the shift parameters is then performed (operation 1410). A work shift is selected from the available work shifts that satisfy the shift parameters (operation 1412). A shift swap request is then sent to the person currently scheduled to perform the selected work shift to exchange the selected work shift for another work shift (operation 1414), with the process terminating thereafter.

Figure 15:
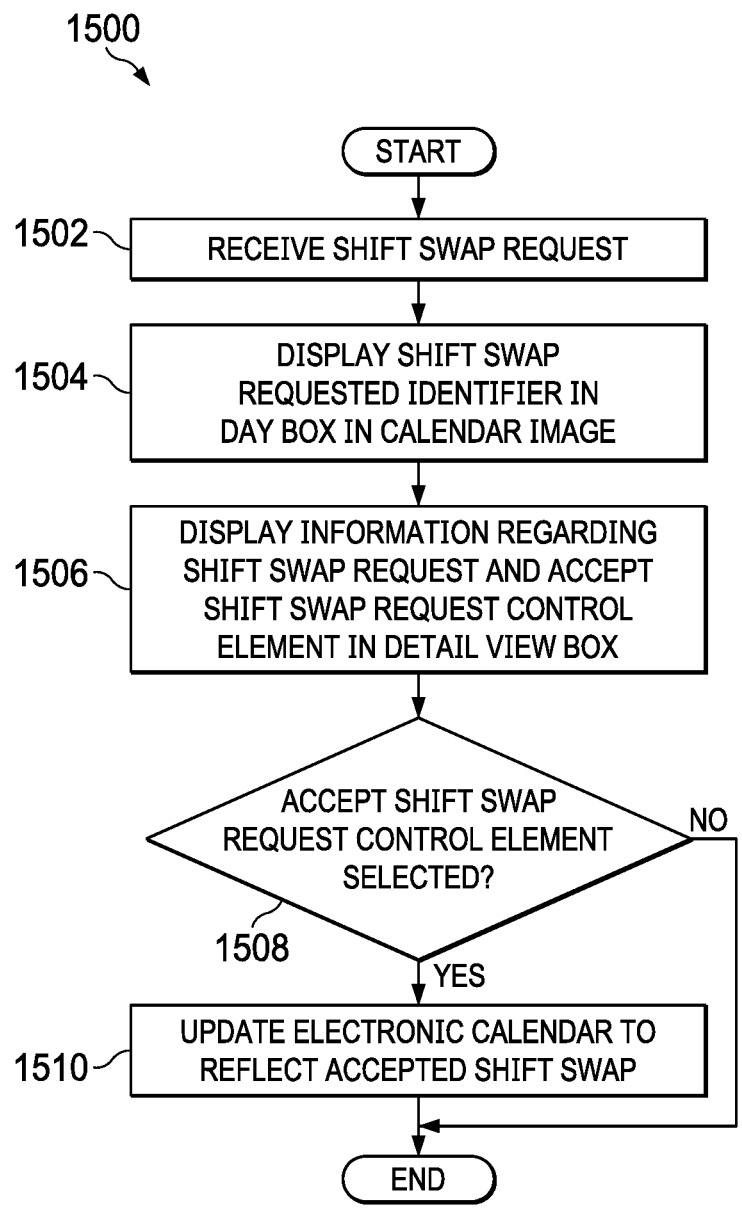
FIG. 15 is an illustration of a flowchart of a process for accepting a requested shift swap in accordance with an illustrative embodiment.

Turning to FIG. 15, an illustration of a flowchart of a process for accepting a requested shift swap is depicted in accordance with an illustrative embodiment. Process 1500 may be implemented, for example, by detail view generator 220 and shift swap engine 222 in electronic calendar 200 in FIG. 2.

Process 1500 may begin with receiving a shift swap request (operation 1502). A shift swap requested identifier may be displayed in a day box for the day of the requested shift swap in a calendar image (operation 1504). Information regarding the shift swap request and an accept shift swap request control element are displayed in a detail view box overlaid on the calendar image (operation 1506). It then may be determined whether the accept shift swap request control element is selected by an operator (operation 1508). The process terminates if the accept shift swap request control element is not selected. Otherwise, the electronic calendar is updated to reflect the accepted shift swap (operation 1510), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

Figure 16:
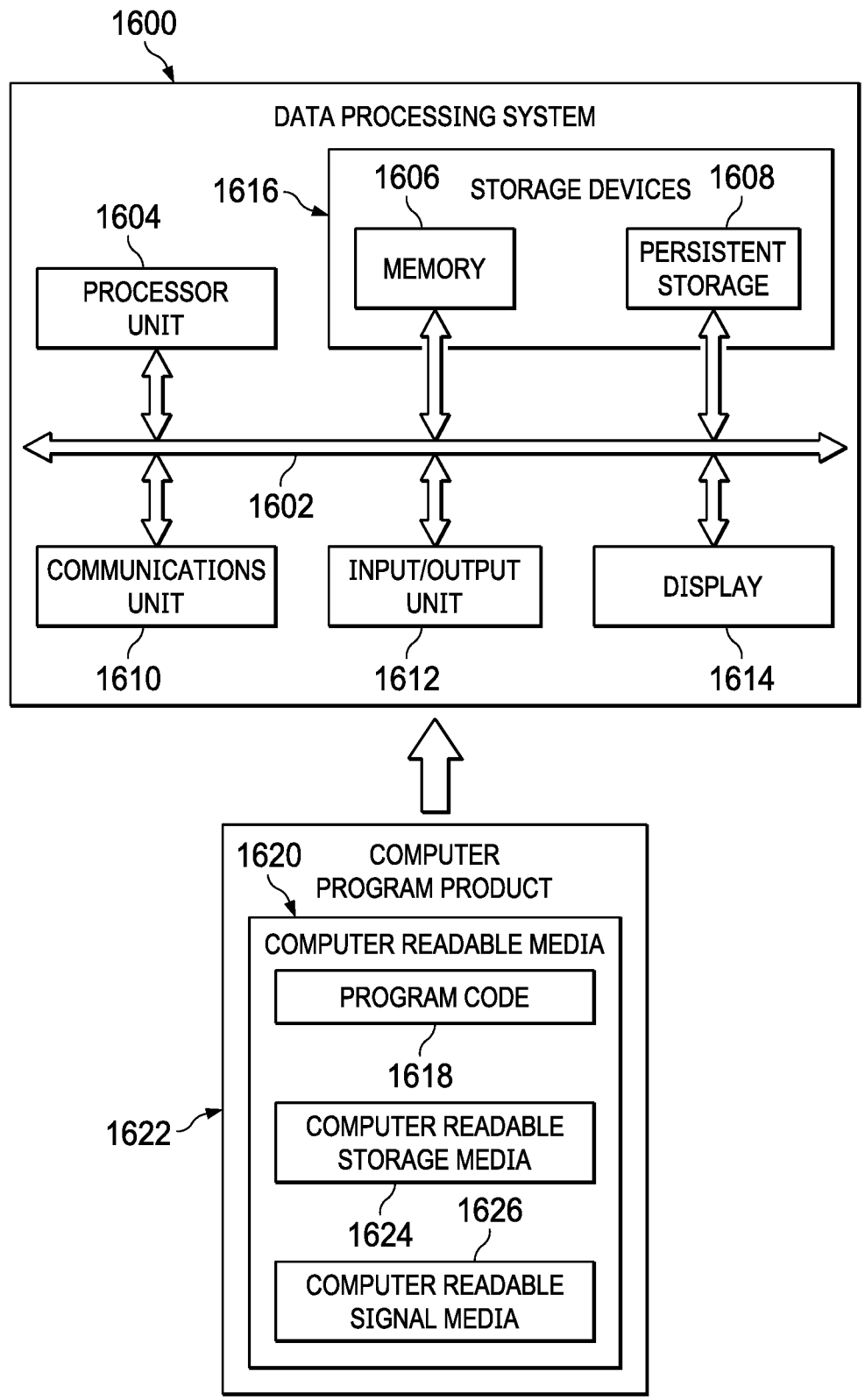
FIG. 16 is an illustration of a block diagram of a data processing system in accordance with an illustrative embodiment.

Turning now to FIG. 16, an illustration of a block diagram of a data processing system is depicted in accordance with an illustrative embodiment. Data processing system 1600 may be used to implement one or more of server computer 104 in FIG. 1, server computer 106 in FIG. 1, client devices 110 in FIG. 1, electronic calendar 200 in FIG. 2, human resources management system 202 in FIG. 2, computer system 203 in FIG. 2, and display device 216 in FIG. 2. In this illustrative example, data processing system 1600 includes communications framework 1602, which provides communications between processor unit 1604, memory 1606, persistent storage 1608, communications unit 1610, input/output unit 1612, and display 1614. In this example, communications framework 1602 may take the form of a bus system.

Processor unit 1604 serves to execute instructions for software that may be loaded into memory 1606. Processor unit 1604 may be a number of processors, a multi-processor core, or some other type of processor, depending on the particular implementation. In an embodiment, processor unit 1604 comprises one or more conventional general purpose central processing units (CPUs). In an alternate embodiment, processor unit 1604 comprises one or more graphical processing units (CPUs).

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that may be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs may be located in storage devices 1616, which are in communication with processor unit 1604 through communications framework 1602. The processes of the different embodiments may be performed by processor unit 1604 using computer-implemented instructions, which may be located in a memory, such as memory 1606.

These instructions are referred to as program code, computer-usable program code, or computer-readable program code that may be read and executed by a processor in processor unit 1604. The program code in the different embodiments may be embodied on different physical or computer-readable storage media, such as memory 1606 or persistent storage 1608.

Program code 1618 is located in a functional form on computer-readable media 1620 that is selectively removable and may be loaded onto or transferred to data processing system 1600 for execution by processor unit 1604. Program code 1618 and computer-readable media 1620 form computer program product 1622 in these illustrative examples. In one example, computer-readable media 1620 may be computer-readable storage media 1624 or computer-readable signal media 1626.

In these illustrative examples, computer-readable storage media 1624 is a physical or tangible storage device used to store program code 1618 rather than a medium that propagates or transmits program code 1618. Alternatively, program code 1618 may be transferred to data processing system 1600 using computer-readable signal media 1626.

Computer-readable signal media 1626 may be, for example, a propagated data signal containing program code 1618. For example, computer-readable signal media 1626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media 1620" can be singular or plural. For example, program code 1618 can be located in computer-readable media 1620 in the form of a single storage device or system. In another example, program code 1618 can be located in computer-readable media 1620 that is distributed in multiple data processing systems. In other words, some instructions in program code 1618 can be located in one data processing system while other instructions in program code 1618 can be located in another data processing system. For example, a portion of program code 1618 can be located in computer-readable media 1620 in a server computer while another portion of program code 1618 can be located in computer-readable media 1620 located in a set of client computers.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code 1618.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An electronic calendar, comprising:
a processor;
a display device coupled to the processor, the display device comprising a display screen;
a calendar view generator configured to display a calendar image of a calendar for a first person on the display screen of the display device, wherein the calendar image comprises a plurality of day boxes, wherein a summary of information for the first person for a first day is displayed in a first day box corresponding to the first day in the plurality of day boxes;
a detail view generator configured to display a first detail view box overlaid on the calendar image in response to a selection of the first day box by an operator, wherein shift information regarding a first work shift for the first person on the first day and a shift swap request control element for requesting a shift swap are displayed in the first detail view box; and a shift swap engine configured to, in response to a selection of the shift swap request control element by the operator, identify a second work shift for a second person and send a first shift swap request to exchange the second work shift for the first work shift to the second person,
wherein:
the calendar view generator is configured to reduce a size of the display of the calendar image; and
the detail view generator is configured to:
maintain a size of the display of the first detail view box overlaid on the calendar image as the size of the display of the calendar image is reduced,
determine whether a portion of the calendar image overlaid by the first detail view box is greater than a threshold percentage of the size of the calendar image, and
display a full screen display of the first detail view box in response to a determination that the portion of the calendar image overlaid by the first detail view box is greater than the threshold percentage of the size of the calendar image.

2. The electronic calendar of claim 1, wherein the shift swap engine is further configured to:
in response to the selection of the shift swap request control element by the operator, display a shift search interface on the display screen;
receive shift parameters for a work shift from the operator via the shift search interface;
search for available work shifts that satisfy the shift parameters; and
identify the second work shift from the available work shifts.

3. The electronic calendar of claim 1, wherein:
the shift swap engine is further configured to receive a second shift swap request to exchange a third work shift for the first person on a second day for a fourth work shift;
the calendar view generator is configured to display a shift swap requested identifier indicating the second shift swap request for the second day in a second day box corresponding to the second day in the plurality of day boxes; and
the detail view generator is configured to display a second detail view box overlaid on the calendar image in response to a selection of the second day box by the operator, wherein shift information regarding the fourth work shift and a shift swap accept control element for accepting the second shift swap request are displayed in the second detail view box.

4. The electronic calendar of claim 1, wherein the detail view generator is configured to:

determine whether a width of the first detail view box will fit between a right side of the first day box and a right side of the calendar image;

display the first detail view box adjacent to the right side of the first day box in response to a determination that the width of the first detail view box will fit between the right side of the first day box and the right side of the calendar image;

in response to a determination that the width of the first detail view box will not fit between the right side of the first day box and the right side of the calendar image, determine whether the width of the first detail view box will fit between a left side of the first day box and a left side of the calendar image; and display the first detail view box adjacent to the left side of the first day box in response to a determination that the width of the first detail view box will fit between the left side of the first day box and the left side of the calendar image.

5. The electronic calendar of claim 1, wherein the detail view generator is configured to:

determine whether a length of the first detail view box between a top side of the first detail view box and a bottom side of the first detail view box will fit between a top side of the first day box and a bottom side of the calendar image;

display the first detail view box with the top side of the first detail view box aligned with the top side of the first day box in response to a determination that the length of the first detail view box will fit between the top side of the first day box and the bottom side of the calendar image; and display the first detail view box with the bottom side of the first detail view box adjacent to the bottom side of the calendar image in response to a determination that the length of the first detail view box will not fit between the top side of the first day box and the bottom side of the calendar image.

6. A method of controlling an electronic calendar, comprising:

displaying, by a computer system, a calendar image of a calendar for a first person on a display screen on a display device, wherein the calendar image comprises a plurality of day boxes, wherein a summary of information for the first person for a first day is displayed in a first day box corresponding to the first day in the plurality of day boxes;

displaying, by the computer system, a first detail view box overlaid on the calendar image in response to a selection of the first day box by an operator, wherein shift information regarding a first work shift for the first person on the first day and a shift swap request control element for requesting a shift swap are displayed in the first detail view box;

in response to a selection of the shift swap request control element by the operator, identifying, by the computer system, a second work shift for a second person and sending a first shift swap request to exchange the second work shift for the first work shift to the second person;

reducing a size of the display of the calendar image;

maintaining a size of the display of the first detail view box overlaid on the calendar image, by the computer system, as the size of the display of the calendar image is reduced;

determining, by the computer system, whether a portion of the calendar image overlaid by the first detail view box is greater than a threshold percentage of the size of the calendar image; and displaying, by the computer system, a full screen display of the first detail view box in response to a determination that the portion of the calendar image overlaid by the first detail view box is greater than the threshold percentage of the size of the calendar image.

7. The method of claim 6 further comprising:

in response to the selection of the shift swap request control element by the operator, displaying, by the computer system, a shift search interface on the display screen;

receiving, by the computer system, shift parameters for a work shift from the operator via the shift search interface;

searching for available work shifts that satisfy the shift parameters by the computer system; and identifying, by the computer system, the second work shift from the available work shifts.

8. The method of claim 6 further comprising:

receiving, by the computer system, a second shift swap request to exchange a third work shift for the first person on a second day for a fourth work shift;

displaying, by the computer system, a shift swap requested identifier indicating the second shift swap request for the second day in a second day box corresponding to the second day in the plurality of day boxes;

displaying, by the computer system, a second detail view box overlaid on the calendar image in response to a selection of the second day box by the operator, wherein shift information regarding the fourth work shift and a shift swap accept control element for accepting the second shift swap request are displayed in the second detail view box.

9. The method of claim 6 further comprising:

determining, by the computer system, whether a width of the first detail view box will fit between a right side of the first day box and a right side of the calendar image;

displaying, by the computer system, the first detail view box adjacent to the right side of the first day box in response to a determination that the width of the first detail view box will fit between the right side of the first day box and the right side of the calendar image;

in response to a determination that the width of the first detail view box will not fit between the right side of the first day box and the right side of the calendar image, determining, by the computer system, whether the width of the first detail view box will fit between a left side of the first day box and a left side of the calendar image; and displaying, by the computer system, the first detail view box adjacent to the left side of the first day box in response to a determination that the width of the first detail view box will fit between the left side of the first day box and the left side of the calendar image.

10. The method of claim 6 further comprising:

determining, by the computer system, whether a length of the first detail view box between a top side of the first detail view box and a bottom side of the first detail view box will fit between a top side of the first day box and a bottom side of the calendar image;

displaying, by the computer system, the first detail view box with the top side of the first detail view box aligned with the top side of the first day box in response to a determination that the length of the first detail view box will fit between the top side of the first day box and the bottom side of the calendar image; and displaying, by the computer system, the first detail view box with the bottom side of the first detail view box adjacent to the bottom side of the calendar image in response to a determination that the length of the first detail view box will not fit between the top side of the first day box and the bottom side of the calendar image.

11. An electronic calendar, comprising:

a processor;

a display device coupled to the processor, the display device comprising a display screen;

a calendar view generator configured to display a calendar image of a calendar for a person on the display screen of the display device, wherein the calendar image comprises a plurality of day boxes, wherein a first summary of information for the person for a first day is displayed in a first day box corresponding to the first day in the plurality of day boxes and a second summary of information for the person for a second day is displayed in a second day box corresponding to the second day in the plurality of day boxes; and a detail view generator configured to:
 display a first detail view box adjacent to the first day box in response to a selection of the first day box by an operator, wherein first detailed information for the person for the first day is displayed in the first detail view box, the first detailed information comprising more information than the first summary of information, and
 stop displaying the first detail view box and display a second detail view box adjacent to the second day box in response to a selection of the second day box by the operator while the first detail view box is being displayed, wherein second detailed information for the person for the second day is displayed in the second detail view box, the second detailed information comprising more information than the second summary of information, wherein:

the calendar view generator is configured to reduce a size of the display of the calendar image; and the detail view generator is configured to:
 maintain a size of the display of the first detail view box overlaid on the calendar image as the size of the display of the calendar image is reduced,
 determine whether a portion of the calendar image overlaid by the first detail view box is greater than a threshold percentage of the size of the calendar image, and
 display a full screen display of the first detail view box in response to a determination that the portion of the calendar image overlaid by the first detail view box is greater than the threshold percentage of the size of the calendar image.

12. The electronic calendar of claim 11, wherein the detail view generator is configured to:
 determine whether a width of the first detail view box will fit between a right side of the first day box and a right side of the calendar image;
 display the first detail view box adjacent to the right side of the first day box in response to a determination that the width of the first detail view box will fit between the right side of the first day box and the right side of the calendar image;
 in response to a determination that the width of the first detail view box will not fit between the right side of the first day box and the right side of the calendar image, determine whether the width of the first detail view box will fit between a left side of the first day box and a left side of the calendar image; and
 display the first detail view box adjacent to the left side of the first day box in response to a determination that the width of the first detail view box will fit between the left side of the first day box and the left side of the calendar image.

13. The electronic calendar of claim 11, wherein the detail view generator is configured to:
 determine whether a length of the first detail view box between a top side of the first detail view box and a bottom side of the first detail view box will fit between a top side of the first day box and a bottom side of the calendar image;
 display the first detail view box with the top side of the first detail view box aligned with the top side of the first day box in response to a determination that the length of the first detail view box will fit between the top side of the first day box and the bottom side of the calendar image; and
 display the first detail view box with the bottom side of the first detail view box adjacent to the bottom side of the calendar image in response to a determination that the length of the first detail view box will not fit between the top side of the first day box and the bottom side of the calendar image.

14. The electronic calendar of claim 11, wherein the first detailed information displayed in the first detail view box comprises shift information regarding a work shift for the person on the first day and a shift swap request control element for requesting a shift swap.

15. The electronic calendar of claim 11, wherein:
 the first summary of information displayed in the first day box comprises a shift swap requested identifier indicating a shift swap request for the first day; and
 the first detailed information displayed in the first detail view box comprises shift information regarding the shift swap request and a shift swap accept control element for accepting the shift swap request.

16. A method of controlling an electronic calendar, comprising:
 displaying, by a computer system, a calendar image of a calendar for a person on a display screen on a display device, wherein the calendar image comprises a plurality of day boxes, wherein a first summary of information for the person for a first day is displayed in a first day box corresponding to the first day in the plurality of day boxes and a second summary of information for the person for a second day is displayed in a second day box corresponding to the second day in the plurality of day boxes;
 displaying, by the computer system, a first detail view box adjacent to the first day box in response to a selection of the first day box by an operator, wherein first detailed information for the person for the first day is displayed in the first detail view box, the first detailed information comprising more information than the first summary of information;
 stopping displaying the first detail view box and displaying a second detail view box adjacent to the second day box, by the computer system, in response to a selection of the second day box by the operator while the first detail view box is being displayed, wherein second detailed information for the person for the second day is displayed in the second detail view box, the second detailed information comprising more information than the second summary of information;

reducing a size of the display of the calendar image;

maintaining a size of the display of the first detail view box overlaid on the calendar image, by the computer system, as the size of the display of the calendar image is reduced;

determining, by the computer system, whether a portion of the calendar image overlaid by the first detail view box is greater than a threshold percentage of the size of the calendar image; and displaying, by the computer system, a full screen display of the first detail view box in response to a determination that the portion of the calendar image overlaid by the first detail view box is greater than the threshold percentage of the size of the calendar image.

17. The method of controlling an electronic calendar of claim 16 further comprising:

determining, by the computer system, whether a width of the first detail view box will fit between a right side of the first day box and a right side of the calendar image;

displaying, by the computer system, the first detail view box adjacent to the right side of the first day box in response to a determination that the width of the first detail view box will fit between the right side of the first day box and the right side of the calendar image;

in response to a determination that the width of the first detail view box will not fit between the right side of the first day box and the right side of the calendar image, determining, by the computer system, whether the width of the first detail view box will fit between a left side of the first day box and a left side of the calendar image; and displaying, by the computer system, the first detail view box adjacent to the left side of the first day box in response to a determination that the width of the first detail view box will fit between the left side of the first day box and the left side of the calendar image.

18. The method of controlling an electronic calendar of claim 16 further comprising:

determining, by the computer system, whether a length of the first detail view box between a top side of the first detail view box and a bottom side of the first detail view box will fit between a top side of the first day box and a bottom side of the calendar image;

displaying, by the computer system, the first detail view box with the top side of the first detail view box aligned with the top side of the first day box in response to a determination that the length of the first detail view box will fit between the top side of the first day box and the bottom side of the calendar image; and displaying, by the computer system, the first detail view box with the bottom side of the first detail view box adjacent to the bottom side of the calendar image in response to a determination that the length of the first detail view box will not fit between the top side of the first day box and the bottom side of the calendar image.

19. The method of controlling an electronic calendar of claim 16, wherein the first detailed information displayed in the first detail view box comprises shift information regarding a work shift for the person on the first day and a shift swap request control element for requesting a shift swap.

20. The method of controlling an electronic calendar of claim 16, wherein:

the first summary of information displayed in the first day box comprises a shift swap requested identifier indicating a shift swap request for the first day; and the first detailed information displayed in the first detail view box comprises shift information regarding the shift swap request and a shift swap accept control element for accepting the shift swap request.

* * * * *